Dec. 3, 1957 C. J. McCARTHY 2,815,153
SUGAR DISPENSER
Filed Nov. 12, 1954 2 Sheets-Sheet 1
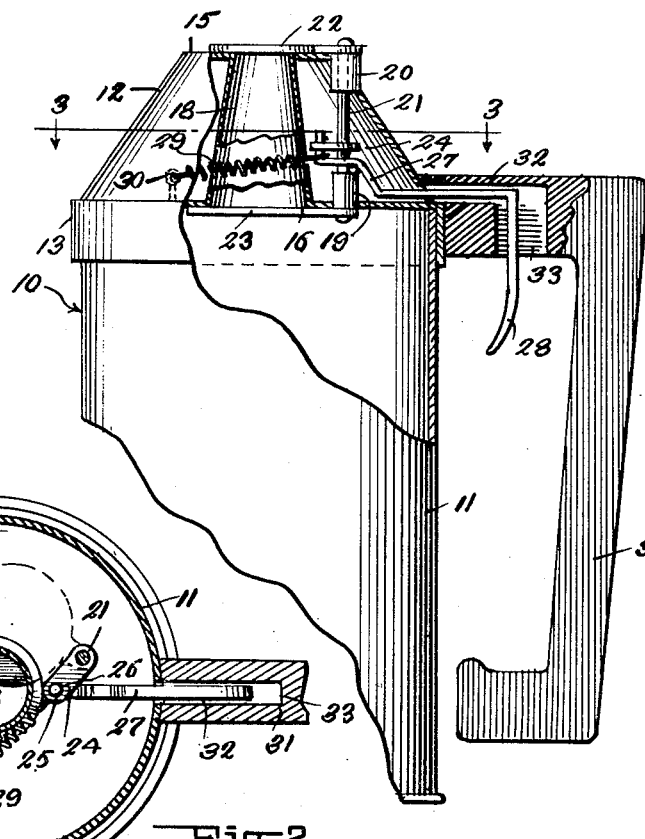
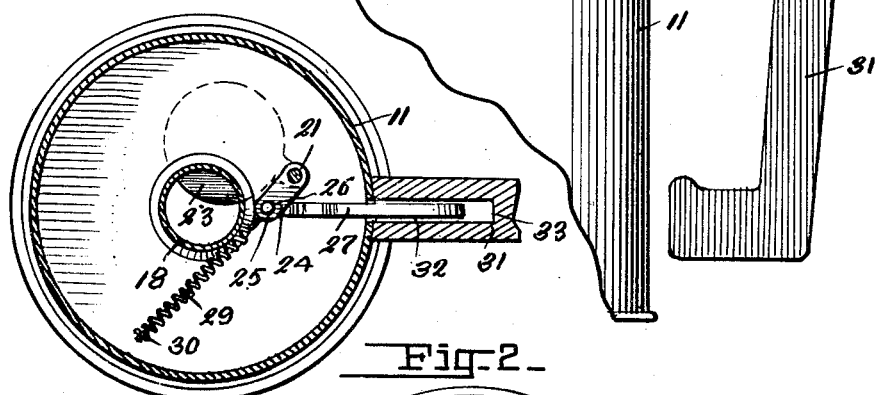
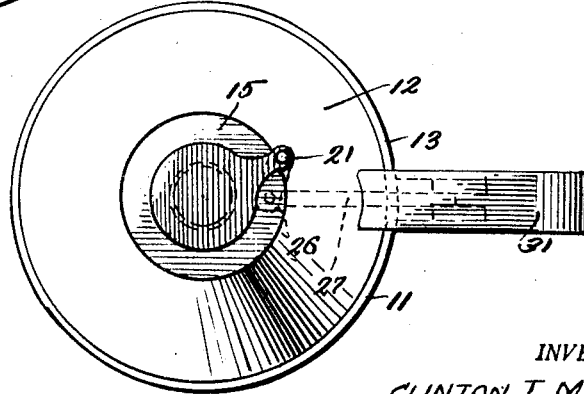
INVENTOR.
CLINTON J. McCARTHY
BY
Patrick D Beaver
ATTORNEY Dec. 3, 1957  C. J. McCARTHY  2,815,153
SUGAR DISPENSER Filed Nov. 12, 1954  2 Sheets-Sheet 2

INVENTOR.
BY CLINTON J. McCARTHY
Patrick D. Beavers
ATTORNEY

United States Patent Office 2,815,153
Patented Dec. 3, 1957

2,815,153
SUGAR DISPENSER
Clinton J. McCarthy, Fort Plain, N. Y.
Application November 12, 1954, Serial No. 468,413
1 Claim. (Cl. 222—441)

This invention relates to improvements in dispensing apparatus, and more particularly to an apparatus for dispensing sugar.

An object of the invention is to provide a dispensing apparatus that is equipped with a pair of simultaneously operating valves and when not in use one of the valves will always remain closed for sanitary reasons.

Another object of the invention is to provide a dispensing apparatus that is provided with a dispensing tube that prevents the contents of the apparatus from being sprayed when such contents are dispensed into a container.

A further object of the invention is to provide cutting edges on the valves controlling the dispensing of the contents of the apparatus so that lumps of sugar will be broken by the action of the valves to prevent clogging of the dispensing tube.

A still further object of the invention is to provide a dispensing apparatus that possesses a neat and attractive appearance, is inexpensive to manufacture and is sturdy and simplified in construction.

The size of the dispenser may be varied according to the contents of the apparatus that is desired to be dispensed, and it can be used to dispense more than one ingredient, depending upon the contents of the dispenser.

With the above and other objects and advantages in view the invention consists of the minor details of construction, arrangement and combination of parts more fully hereinafter described, claimed and illustrated in the accompanying drawings in which:

Fig. 1 is an elevational view, partly in section and partly broken away, of a dispensing apparatus embodying the invention;

Fig. 2 is a top plan view of the dispensing apparatus of Fig. 1 with the top valve in closed position;

Fig. 3 is a transverse sectional view on the line 3—3 of Fig. 1;

Figure 4:
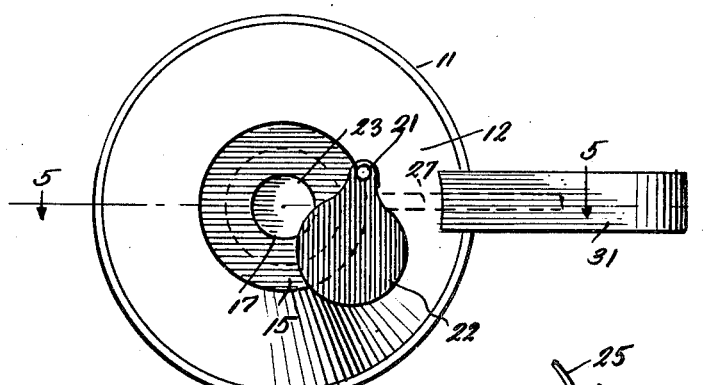
Fig. 4 is a top plan view similar to Fig. 2 with the top valve in open position.

Referring more in detail to the drawings, wherein like parts are designated by like reference numerals the dispensing apparatus embodying the invention is generally designated by the reference numeral 10.

The dispensing apparatus 10 includes a container 11 which may be of any desired size and made of any suitable material.

The container 11, as shown, is of cylindrical formation and is provided with a closed bottom and an open top.

The open top of the container is closed by a conical shaped housing 12 which is provided with an annular flange 13 that will engage the upper peripheral edge of the container 11.

The housing 12 is provided with a partition 14 that is contiguous with the upper peripheral edge of the flange 13 and a closed circular outer end 15.

The partition 14 is provided with a centrally located circular opening 16 and the closed outer end is also provided with a centrally located circular opening 17. The opening 16 has a greater circumference than the opening 17 and the openings are in axial alinement with each other.

A conical shaped dispensing tube 18 provides a direct passageway between the two openings 16 and 17 and the ends of the tube 18 merge with the edge of the partition 14 and edge of the closed top 15 forming the openings 16 and 17, respectively.

A bearing 19 is mounted on the inner surface of the partition 14 and a bearing 20 is mounted on the inner surface of the closed top 15. The bearings 19 and 20 are in axial alinement with each other to rotatably receive a shaft 21.

The upper end of the shaft 21 extends beyond the closed top 15 to have fixed thereto a circular valve 22 and the lower end of the shaft 21 extends below the partition 14 to have fixed thereto a circular valve 23. The valve 22 will open and close the opening 16 in the partition 14 and the valve 23 will open and close the opening 17 in the closed top 15 as will be later described.

Intermediate of the ends of the shaft 21 there is fixed thereto a short arm 24 which has at its outer end an aperture 25.

A pin 26 is loosely receivable in the aperture 25 and is fixed to the inner end of a lever 27 at right angles thereto.

The outer end of the lever 27 is provided with a trigger or finger grip 28 and as the lever is reciprocated the shaft 21 will rotate causing the valves 22 and 23 to pivot and to open or close the openings 16 and 17.

A spring 29 fixed at one end to the pin 26 and at the other end to an eye 30 in the partition 14 will maintain the valves 22 and 23 in closed relation to the openings 16 and 17, respectively.

A handle 31 is provided for the dispensing apparatus 10 and is fixed to the housing 12 and flange 13, as shown in Fig. 1. The shoulders of the open ended recess also act as stops for limiting the movement of the finger grip 28 which in turn will limit the movement of the valve 22 when it is opened and closed for the dispensing of sugar. The handle 31 is provided with a channel 32 to receive the lever 27 and an open ended recess 33 in the handle 31 receives the finger grip 28.

Figure 5:
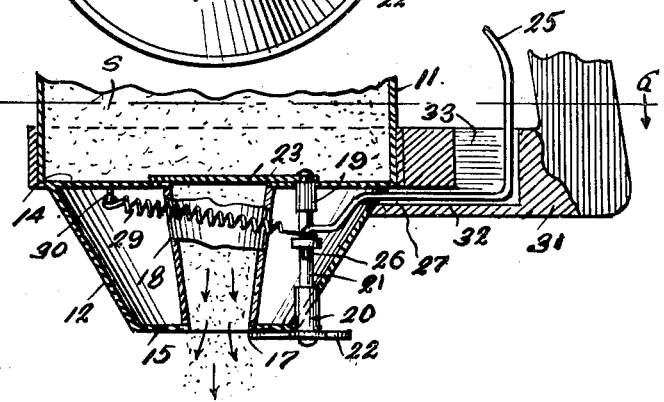
Fig. 5 is a transverse sectional view on the line 5—5 of Fig. 4 showing the dispensing apparatus in inverted or dispensing position.
Figure 6:
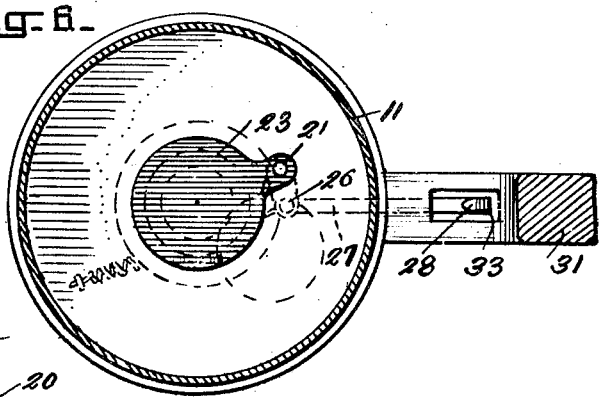
Fig. 6 is a transverse sectional view on the line 6—6 of Fig. 5.
Figure 7:
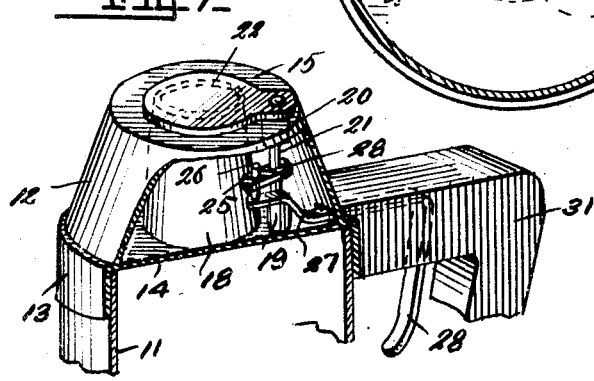
Fig. 7 is a sectional perspective view, partly broken away, of the dispensing mechanism of the dispensing apparatus.

In use the dispensing apparatus is placed in inverted position, as shown in Fig. 5, then when the handle 31 is grasped by the hand and the finger grip 28 is compressed the valves will be caused to pivot with the shaft 21. The angularity of the relative position of the valves is such that when the valve 23 is two thirds open the valve 22 will be closed. Since the opening 16 is larger than the opening 17, the valve 23 is larger in circumference than the valve 22. The valves will pivot simultaneously with the rotation of the shaft 21.

Before the finger grip 28 is compressed the valve 22 is closed and the valve 23 is open. Upon compressing the finger grip 28 the valve 22 will open and the valve 23 will close. At this time one teaspoon of sugar S is within the tube 18 and this amount will be dispensed through the opening 17 while the valve 23 will cut off the further flow of sugar to the tube 18.

After the sugar has flowed outwardly the tube 18, the finger grip 28 is released and the valves 22 and 23 will return to normal positions. Sugar will then flow into the tube 18 and be ready for the next dispensing operation.

The edges of the valves 22 and 23 are sharpened to cut up any lumps that might occur in the sugar.

The valve 22 will maintain the opening 16 in closed position at all times, thus dirt cannot gain admittance to the contents of the dispensing apparatus.

When not in use the dispensing apparatus can be set on the bottom of the container 11.

The dispensing apparatus could include a large container and placed on a stand or positioned in inverted position in a cafeteria or other places where self-service is used. The apparatus would quickly measure teaspoons of sugar for each person and would save time and sugar that is spilled or wasted by the well-known bowl and teaspoon combination. The apparatus could be sealed and thus made sanitary.

While sugar has been used as an example of the contents of the dispensing apparatus, it is to be understood that the invention is not to be limited to the dispensing of sugar alone.

It is believed that the operation and construction of the invention will be clear to those skilled in the art and it is to be undertsood that changes in the minor details of construction, arrangement and combination of parts may be resorted to provided they fall within the spirit of the invention and the scope of the appended claim.

Having thus described the invention what is claimed as new and desired to be secured by Letters Patent is:

A device of the character described comprising, in combination with an open-topped container, a housing having a dependent flange for receiving the upper end portion of said container and having a pair of vertically aligned openings therein, a tube mounted in said housing and forming a passageway between said openings, a shaft pivotally mounted in said housing in parallel relation to the longitudinal axis of said tube, a valve for each of said openings, an arm interconnecting each valve with said shaft, said arms extending radially from said shaft and angularly with respect to each other, spring means in said housing normally urging the lowermost valve to closed position and the uppermost valve to open position, trigger means carried by said housing for rotating said shaft against the action of said spring means whereby to carry said outermost valve to open position and said uppermost valve to closed position, said valves having sharpened edges, and a handle attached to said housing.

References Cited in the file of this patent
UNITED STATES PATENTS

| | | |
|---|---|---|
| 288,066 | Kessler | Nov. 6, 1883 |
| 304,214 | McCarthy | Aug. 26, 1884 |
| 1,036,807 | Dickey | Aug. 27, 1912 |
| 1,302,289 | Bindley | Apr. 29, 1919 |
| 1,607,530 | Guest | Nov. 16, 1926 |